US009911966B2

(12) United States Patent
Elian et al.

(10) Patent No.: US 9,911,966 B2
(45) Date of Patent: Mar. 6, 2018

(54) BATTERY CELL (71) Applicant: Infineon Technologies AG, Neubiberg (DE)

(72) Inventors: Klaus Elian, Alteglofsheim (DE); Werner Roessler, Neufahrn (DE); Werner Breuer, Sinzing-Viehhausen (DE)

(73) Assignee: Infineon Technologies AG, Neubiberg (DE)

( * ) Notice: Subject to any disclaimer, the term of this patent is extended or adjusted under 35 U.S.C. 154(b) by 284 days.

(21) Appl. No.: 14/689,259

(22) Filed: Apr. 17, 2015

(65) Prior Publication Data
US 2015/0303442 A1 Oct. 22, 2015

(30) Foreign Application Priority Data
Apr. 17, 2014 (DE) .................. 10 2014 005 745

(51) Int. Cl.
*H01M 2/34* (2006.01)
*H01M 2/10* (2006.01)
(Continued)

(52) U.S. Cl.
CPC ....... *H01M 2/345* (2013.01); *H01M 10/4257* (2013.01); *H02J 7/0031* (2013.01);
(Continued)

(58) Field of Classification Search
CPC ........ H01M 2/345; H01M 2/26; H01M 2/348; H01M 2/34; H01M 10/4257; H02J 7/0031
(Continued)

(56) References Cited

U.S. PATENT DOCUMENTS 2,154,653 A * 4/1939 Anketell ................. F21L 14/00
200/60
4,855,195 A * 8/1989 Georgopoulos ...... H01M 2/348
429/54
(Continued)

FOREIGN PATENT DOCUMENTS

CN 101379655 A 3/2009
CN 101673838 A 3/2010
(Continued)

OTHER PUBLICATIONS

Office Action dated Feb. 6, 2017 for Chinese Patent Application No. 201510182941.6.

Primary Examiner — M'Baye Diao
(74) Attorney, Agent, or Firm — Schiff Hardin LLP (57) ABSTRACT A battery cell having a first switching member switchable between a first position and a second position, wherein in the first position of the first switching member, a first electrode of the battery stack is being connected to a first terminal of the battery cell. In the second position of the first switching member the first electrode is being separated from the first terminal. The battery cell may further comprise a control unit in order to control a switching of the first switching member. Optionally there may be a second switching member providing a bypass between the second electrode and the first terminal, once the first terminal is being separated from the first electrode in response to a critical state of the battery cell.

24 Claims, 5 Drawing Sheets (51) Int. Cl.
  *H01M 10/42* (2006.01)
  *H02J 7/00* (2006.01)
  *H01M 2/26* (2006.01)

(52) U.S. Cl.
  CPC ............... *H01M 2/26* (2013.01); *H01M 2/34* (2013.01); *H01M 2/348* (2013.01); *H01M 2010/4278* (2013.01); *H01M 2200/00* (2013.01); *H01M 2200/10* (2013.01); *H01M 2200/20* (2013.01); *H02J 7/007* (2013.01)

(58) Field of Classification Search
  USPC .................................. 429/97, 100; 320/136
  See application file for complete search history.

(56) References Cited

U.S. PATENT DOCUMENTS

| | | | | |
|---|---|---|---|---|
| 5,026,615 | A * | 6/1991 | Tucholski | H01M 2/34 429/58 |
| 6,307,350 | B1 * | 10/2001 | Alderman | H01M 10/425 320/116 |
| 6,835,491 | B2 * | 12/2004 | Gartstein | H01M 6/5044 320/132 |
| 7,638,977 | B2 * | 12/2009 | Park | H01M 10/482 320/134 |
| 8,093,863 | B2 * | 1/2012 | Carrier | H01M 2/1022 320/116 |
| 8,698,457 | B2 * | 4/2014 | Hogari | H01M 10/486 320/134 |
| 9,768,473 | B2 * | 9/2017 | Roh | H01M 2/34 |
| 2003/0027036 | A1 | 2/2003 | Emori et al. | |
| 2012/0251860 | A1 * | 10/2012 | Marple | H01M 4/381 429/94 |
| 2012/0315522 | A1 * | 12/2012 | Shin | H01M 2/1077 429/92 |
| 2013/0078490 | A1 * | 3/2013 | Morita | H01M 4/133 429/92 |
| 2013/0244062 | A1 * | 9/2013 | Teramoto | H01M 10/4257 429/7 |
| 2015/0226810 | A1 * | 8/2015 | Elian | H04Q 9/00 429/90 |

FOREIGN PATENT DOCUMENTS

| | | |
|---|---|---|
| CN | 102640336 A | 8/2012 |
| CN | 203481335 U | 3/2014 |
| CN | 103718345 A | 4/2014 |
| DE | 102011117474 | 5/2013 |
| DE | 102012016022 | 3/2014 |

* cited by examiner

FIG 1  State of the art

BATTERY CELL

TECHNICAL FIELD

The present application relates to a battery cell and a method of operating a battery cell.

BACKGROUND

Battery cells and in particular rechargeable battery cells are reliable sources of energy not only in mobile and/or portable devices such as cars, vehicles, mobile telecommunication devices, mobile computers and the like. Over recent years for example lithium ion based batteries, in particular rechargeable lithium ion batteries or accumulators are known in the field.

Some of the known batteries are sensitive to environmental conditions, charging, and/or discharging, i.e. charging protocols. If such battery cells are not treated according to a prescribed protocol for charging and/or discharging, these batteries may cause fire, generate considerable amounts of potentially toxic gases, potentially causing explosions and/or ruptures of a casing of the battery cell and or the known battery comprising one or more of the battery cells.

Further with some of the known batteries issues may arise due to impurities entering the battery during its manufacturing.

The present application aims at providing battery cells according to the present invention as at improving batteries and/or battery cells over the prior art.

A battery cell according to the present invention may comprise a first switching member switchable between a first position and a second position. The switch in the first position connects a first electrode of a battery stack and a first terminal of the battery cell. However, in the second position the switching member separates the first electrode from the first terminal. The first switching member may for example be a reversibly switchable switching member. This is to say that the first switching member may be switched to the first position and back to the first position repeatedly.

DETAILED DESCRIPTION

In the following, various embodiments will be described in detail with reference to the attached drawings. It is to be understood that these embodiments serve illustrative purposes only and are in no way to be construed as limiting the scope of the present invention.

For example, while embodiments are described comprising a plurality of different details, features or elements, in other embodiment, some of these details, features or elements may be omitted, may be implemented in a different manner than shown and/or may be replaced by alternative details, features or elements. Additionally or alternatively, in further embodiments, additional details, features or elements not explicitly described herein may be present. Connections or couplings, for example, electrical connections or couplings shown in the drawings as described herein may be direct connections or indirect connections. Indirect connections being connections with one or more intermediate element, provided the coupling function is maintained.

In particular, when referring to a connection in the following, this connection may be in some embodiments a mechanical connection and/or an electrical connection. Therefore, a switch providing connection between a first element and a second element may only provide a mechanical contact or mechanical connection between named elements. Without any limitation the connection provided by the switch may alternatively and/or additionally be an electrical connection or electrical contact between named elements, depending on circumstances. For example an electrical contact between the named objects may be achieved even without a mechanical connection between named elements.

According to a preferred embodiment a battery cell comprises a first switching member. The first switching member may be switchable between a first position and a second position, in particular the second switching member may be reversibly switchable between the first position and the second position. This is to say that the first switching member may be switched from the first position to the second position and back to the first position at least once.

In the first position the first switching member connects a first electrode of a battery stack of the battery cell with a first terminal of the battery cell. Typically, the battery stack is comprised within the battery cell. The first terminal of the battery cell may be a terminal connecting an inside of the battery cell with an outside of the battery cell. This could, for example, be achieved by the first terminal passing through a housing of the battery cell.

In another embodiment the first switching member may be arranged inside the battery cell, for example inside a housing of the battery cell. This is to say that the first switching member is separated from the outside of the battery cell, be it by a housing or other appropriate means. The battery stack of the battery cell may according to one embodiment at least comprise one of the first electrode, a second electrode, an active material, a separator, or a conducting material. It may be that the second electrode is of a polarity different to the first electrode.

According to another embodiment a second switching member is provided. The second switching member may be switchable between a closed position and an open position. The second switching member may further be reversibly switchable between the closed position and the open position, as was already explained for the first switching member with the first position and the second position. In the closed position the second switching member connects the first terminal to a second electrode of the battery cell. In the open position the first terminal is isolated from the second electrode. The terminal isolated shall be construed as substantially no mechanical contact between the first terminal and the second electrode being provided by the second switching member. The isolation provided by the second switching member may further be construed as providing an electrical isolation between the elements isolated by the second switching member when in the open position.

A Person of ordinary skill in the art will readily understand that depending on circumstances in order to provide electrical isolation for elements isolated from each other when the second switching member is in the open state, may not be sufficient in order to provide an electrical isolation between named elements. It could, for example, be that due to proximity between members of the second switching element and/or the isolated elements isolated from each other, a sparking and/or other electrical connection will be established, even though these elements are not in mechanical contact.

According to a further embodiment a control unit may be provided. The control unit may be adapted to switch the first switching member and/or the second switching member. The control unit may further be adapted to reversibly switch the first switching member and/or the second switching member. It may be of interest to provide the control unit within the battery cell, i.e. separated from an outside of the battery cell, for example a housing separating the battery cell from an outside of the battery cell, but not limited thereto. According to a further embodiment the control unit may be adapted to switch the second switching member to the closed position after the first switching member reaches or has reached the second position. Therefore, the control unit may provide a temporal order for switching the first switching member and the second switching member. Such a temporal order may comprise but is not limited to setting the second switching member to the closed position after the first switching member reached the second position.

According to a further embodiment the control unit may provide a delay, for example, a selectable delay before the second switching member is switched to the closed position after the first switching member reached the second position.

The first switching member may be according to an embodiment of the present invention be selected from a switch, a mechanical switch, a relay, a semiconductor switch, a transistor, a field effect transistor, a MOS-FET, or a solid state switch.

According to a further embodiment the second switching member may be selected from a switch, a mechanical switch, a relay, a semiconductor switch, a transistor, a field effect transistor, a MOS-FET, a solid state switch or the like.

According to a further embodiment the control unit may be powered from the battery cell, alternatively and/or additionally the control unit may comprise an individual power source, i.e. not powered from the battery cell.

According to a further embodiment, the battery cell may comprise at least one sensor coupled to the control unit. A switching of the first switching member and/or the second switching member may be implemented in response to a sensor signal sensed at the sensor and/or delivered from the sensor to the control unit. According to a further embodiment, the at least one sensor may be selected from a pressure sensor, a temperature sensor, a voltage sensor, a gas sensor, or the like. The voltage sensor may, for example, measure an electrical voltage between the first terminal and the second electrode, or the first electrode and the second electrode, but is not limited thereto.

According to a further embodiment the battery cell may comprise a communication line connecting the control unit with an outside of the battery cell. According to a further embodiment, the battery cell may comprise a transmitting and/or receiving element. Transmitting and/or receiving shall be construed as a transmitting and/or receiving electromagnetic radiation as is used in radio systems, radar systems or the like. Without any limitation the transmitting and/or receiving may in another embodiment comprise transmitting and/or receiving ultrasonic signals.

The present invention further relates to a method of operating a battery cell according to the invention, as laid down in the corresponding claims. The method may comprise a step of checking, if there is a dangerous state of the battery cell present.

The method may further comprise a step of operating the battery cell, if there is no dangerous state and opening of a first switching member in case of the dangerous state of the battery cells.

Figure 1:
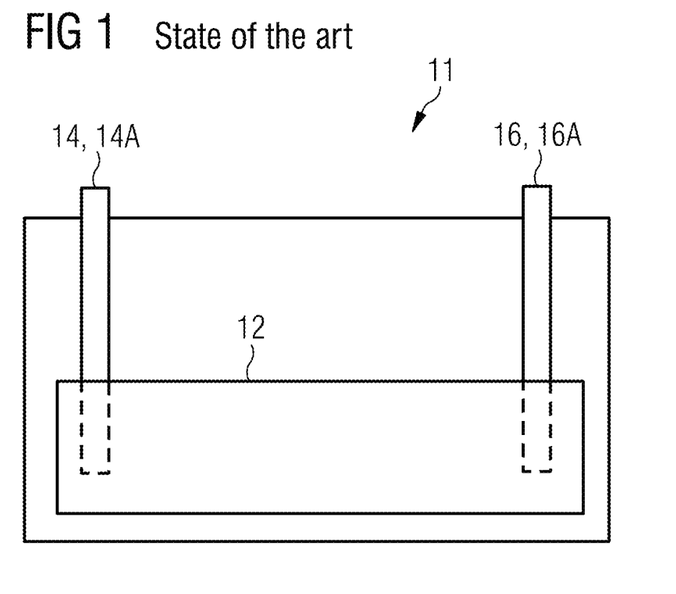
FIG. 1 shows a battery cell according to the prior art.

Turning now to the Figures, FIG. 1 shows a battery cell 11 according to the state of the art. The battery cell 11 comprises a housing, inside the housing a cell stack 12 is disposed. The cell stack 12 comprises a first electrode 14 and a second electrode 16. In FIG. 1 the first electrode 14 and the second electrode 16 end with one of their respective ends outside the housing of the battery cell and therefore also serve as first terminal 14A and second terminal 16A. The battery stack 12 as shown in FIG. 1 is a conventional battery stack. The battery stack 16 may be a wound battery stack, according to the prior art. Such a battery stack may comprise the first electrode 14 and/or the second electrode 16. Typically there is at least one active material, a separator, a second active material and the first electrode and the second electrode. As is known to a person of ordinary skill, such a conventional battery stack will provide a voltage between the first electrode 14 and the second electrode 16, wherein, the first electrode 14 may, for example, be made from a first material, such as copper, and the second electrode 16 may be made from a second material, such as, for example, zinc Zn. A person of ordinary skill will know of several other options of forming first and second electrodes 14, 16 within a conventional battery stack 12 in order to provide an intended voltage between or across the first electrode 14 and the second electrode 16. More precisely, the voltage provided by the conventional battery stack 12 is made available between the first terminal 14A and the second terminal 16A. It is further known to a person of ordinary skill in the field that several battery cells may be combined in series in order to provide a higher voltage than the individual battery cell 11.

Given that some of the battery cell types known in the art are quite susceptible to operational risks, in particular when the required charging and/or discharging protocol is not followed, the present invention intends to minimize these risks known for battery cells 11 of the prior art.

Figure 2:
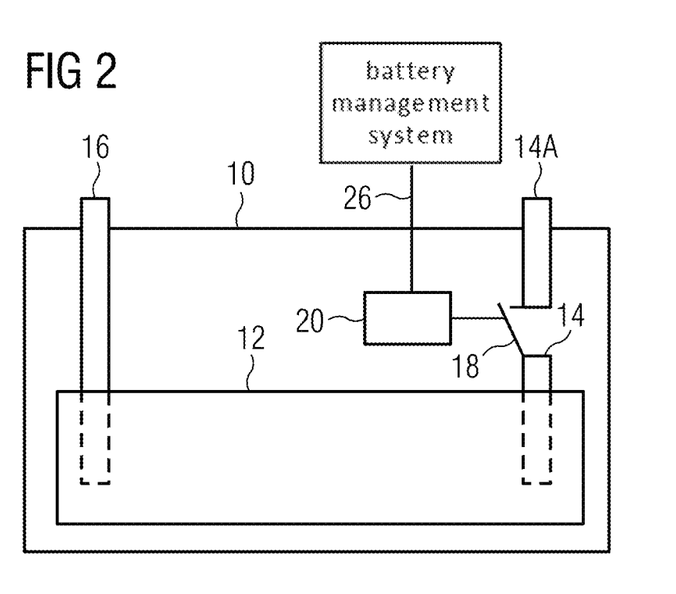
FIG. 2 shows a first embodiment of a battery cell according to the present invention.

An embodiment of a battery cell 10 according to the invention as is shown in FIG. 2. The battery cell 10 according to the invention comprises a housing, which may be a conventional housing of a battery cell as is known in the prior art. The battery cell 10 according to the invention further comprises a cell stack 12, which may be a conventional cell stack as known in the art. Different to the battery cell 11 of the prior art (FIG. 1), in FIG. 2 the first terminal 14A is not directly connected to the first electrode 14 as with the prior art. Instead the first terminal 14A is accessible from outside the battery cell 10 according to the invention, but only via a first switching member 18. The first switching member 18 may reversibly switchable between a first position and a second position. The first switching member in the first position connects the first electrode 14 of the battery stack 12 to the first terminal 14A.

Different to the first electrode 14, the second electrode may be implemented similar to the second electrode 16 as known from the prior art (see FIG. 1). In the battery cell 10 according to the present invention, there is a control unit 20 that operates and/or controls the first switching member 18. The first switching member 18 is shown in FIG. 2 in the open position or open state. In the open state the first switching member 18 does not provide a mechanical connection to the first terminal 14A. In particular, the first switching member 18 does not provide an electrical connection between the first electrode 14 and the first terminal 14A when in the first position, i.e. the open state as shown in FIG. 2.

It is to be understood, if a critical condition of the battery cell 10 should occur, for example during charging and/or discharging of the battery cell 10, then switching the first switching member 18 into the open position, will stop the charging and/or discharging process of the battery cell 10.

Further shown in FIG. 2 is a communication line 26 leading from the control unit 20 to an outside of the battery cell 10. A person of ordinary skill will appreciate, that the communication line may be, for example, used to communicate the critical condition within the battery cell 10 to a battery management system. Likewise and without any limitation the communication line 26 may also be used by the battery management system in order to control or order the control unit 20. The first switching member 18 may be for example switched into the closed position, by a command transmitted over the communication line 26 to the control unit 20, but not limited thereto. Such a command may be issued by the battery management system.

It may be of interest for the control unit 20 and/or the first switching member 18 to be arranged within a housing of the battery cell 10, so in other words within the battery cell 10.

Thereby the risk of a non-professional user of the battery cell manipulating the battery cell 10 is reduced. This may be of interest, in particular, when the battery cell 10 is in a dangerous state, as explained above.

Figure 3:
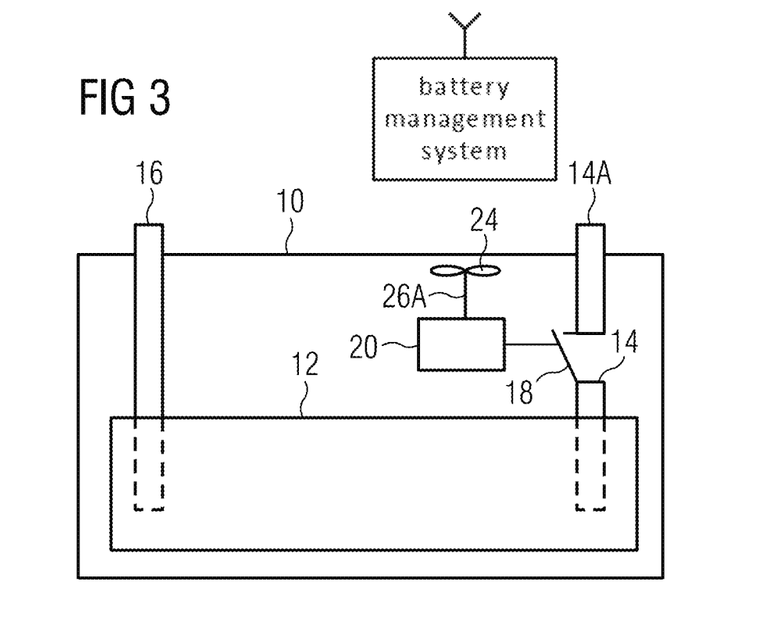
FIG. 3 shows a battery cell according to the present invention.

FIG. 3 shows a further embodiment of the battery cell 10 according to the invention. Like elements within FIG. 3 are indicated using the same reference numerals as within FIG. 2 for the ease of understanding. As in FIG. 2, the first switching member 18 is disposed between the first electrode 14 and the first terminal 14A and shown in the open position. Different to the embodiment shown in FIG. 2, in FIG. 3 the control unit 20 is connected to a transmitting element 24 by a communication line 26A. It is to be understood that the transmitting element 24 may be used in order to transmit a operational state of the control unit 20, the switch 18 and/or the battery cell 10 to the outside of the battery cell 10, for example using radio frequency signals. Therefore, the transmitting element 24 may be used in order to transmit the operational state detected or reached within the battery cell to the outside of the cell. Without any limitation the transmitting element 24 may also be implemented as a transmitting and/or receiving element 24, such that the transmitting element 24 may receive RF-signal from outside the battery cell 10, for example from a battery management system, in order to check the operational state of the control unit 20, the first switching member 18, and/or the battery cell 10. In particular, it is conceivable for the transmitting element 24 to be adapted to receive a control signal or command in order to switch the first switching member 18 from the open state as shown into the closed state, wherein a mechanical and/or electrical contact is established between the first electrode 14 and the first terminal 14A.

It is to be understood that once the first switching element 18 is set to the open state, one may use some sort of communication via the transmitting element 24 in order to set the first switching element 18 into the close state, wherein the electrical contact between the first electrode 14 and the first terminal 14A is re-established.

It is to be understood that once the first switching element 18 is set to the closed condition again, the battery cell 10 may be discharged and/or overcharged as in the prior art. It is conceivable, that once a critical state of the battery cell has been reached, one has to wait a considerable amount of time, until a non-critical state of the battery cell 10 is reached again. To safely switch the first switching member from the open condition into the closed condition, the transmitting element 24 may be used in order to deliver an appropriate command to the control unit 20. Therefore, different to the prior art, the embodiments of the present invention do not only provide a safety switch that is operational once, but the first switching member, that may be selectively switched between the open position and the closed position, reversibly.

A person of ordinary skill in the art will readily understand that once the first switching member 18 is in the closed state, the voltage will be provided across or between the first terminal 14A and the second electrode 16.

Figure 5:
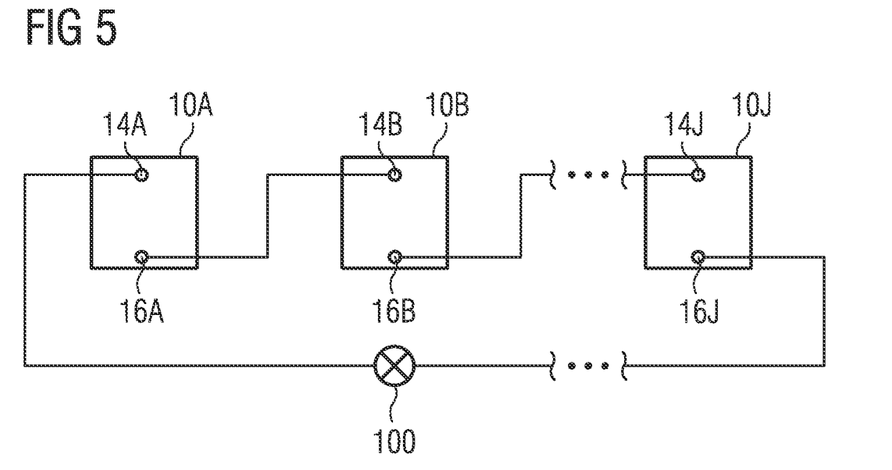
FIG. 5 shows a plurality of battery cells according to the invention being connected in series supplying a voltage to a load.

If the first switching element 18 is in the open state as shown in FIG. 3 and FIG. 2, it is to be understood, that if the battery cell 10 was to be used in a series of battery cells 10, as depicted in FIG. 5, a rather large voltage will be provided between the second electrode 16 and the first terminal 14A. The rather high voltage is typically in the range of the voltage provided by the set of battery cells depicted in FIG. 5. A person of ordinary skill will readily appreciate that the rather high voltage between the first terminal 14A and the second electrode 16 may be dangerous to a user handling the battery cell 10 within a series of battery cells as depicted in FIG. 5.

Figure 4:
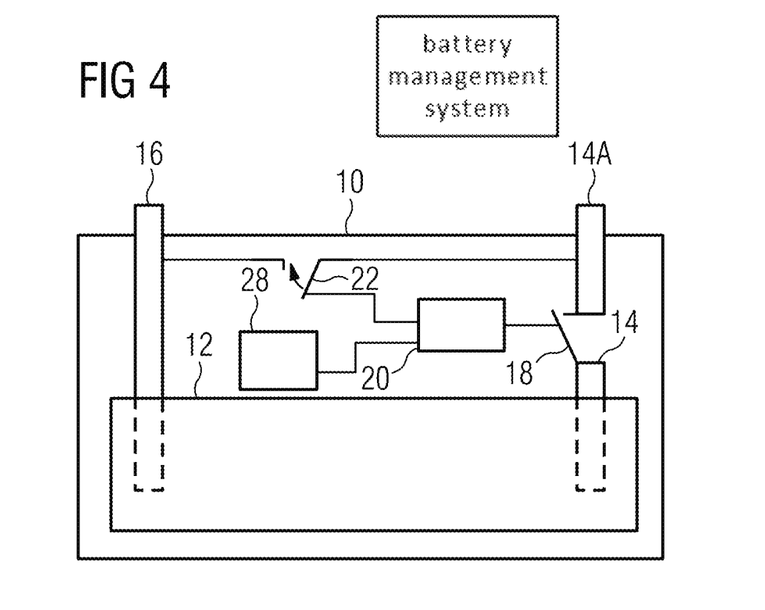
FIG. 4 shows another embodiment of a battery cell according to the present invention.

Turning now to FIG. 4, a battery cell 10 similar to the battery cell 10 shown in FIG. 2 and 3 is depicted. The battery cell 10 of FIG. 4 also comprises the battery stack 12, the first electrode 14, the first terminal 14A and the second electrode 16 as explained before. Although the communication line 26 or 26A is not shown in FIG. 4, such a communication line with or without the transmission element 24 may also be used in the embodiment of FIG. 4.

Additionally to the first switching member 18 the control unit 20 of FIG. 4 is also in communication and may control a second switching member 22. The second switching member 22 may be switchable between a closed position and an open position. In particular the second switching member 22 may be reversibly switchable between the closed position and the open position.

In FIG. 4 the open position of the second switching member 22 is depicted. In the open position there is no mechanical contact between the first terminal 14A and the second electrode 16. In the open position of the second switching element 22 there may further be no electrical contact between the first terminal 14A and the second electrode 16. In the closed position, the second switching member 22 will provide a bypass between the second electrode 16 and the first terminal 14A.

It is to be understood, that the embodiments as shown in FIGS. 2 and 3 may very well be equipped with the second switching member 22 as shown for the embodiment of the battery cell 10 of FIG. 4.

It may be of interest that the control unit 20 switches the first switching member 18 from the first position to the second position, should there be a dangerous state of the battery cell 10. As explained with reference to FIG. 3, there may be a substantial voltage present between the first terminal 14A and the second electrode 16 when the first switching member 18 is in the second position (the open position). It may therefore be of interest to set the second switching member 22 to the closed position, in order to create the bypass between the first terminal 14A and the second electrode 16, as will be explained with regards to FIG. 5.

One may configure the control unit 20 such that the control unit 20 closes the second switching member 22 shortly after the first switching member 18 is being opened. Therefore, the potentially dangerous high voltage between the first terminal and the second electrode may only be present for a short period of time. The delay, according to which the control unit 20 may set the second switching member 22 into the closed position, after the first switching member 18 has reached the open position, may be selectable, for example in the range of a few milliseconds, seconds or nanoseconds depending on circumstances.

It may be of interest to arrange the second switching member 22 inside the battery cell 10, in order to prevent a user of the battery cell from manipulating the second switching member from outside the battery cell 10, as already explained for the first switching member 18.

In FIG. 4 there is a sensor 28 in communication with the control unit 20. It is to be understood that the sensor 28 may be adapted to detect a dangerous state of the battery cell 10. The sensor 28 may be designed in order withstand aggressive media within the battery cell 10, in particular the battery stack 12. Such sensors withstanding aggressive media are disclosed in U.S. application Ser. No. 13/893,970 of the applicant filed on 14 May 2013 which is incorporated herein by reference.

As explained, it may be of interest to switch the first switching member 18 into the second or isolating position and/or the second switching member 22 into the closed position (FIG. 4) in response to the critical state of the battery cell 10 sensed by the sensor 28.

As a further (safety) routine, a battery management system may also trigger a controlled switching of the second switching member 22 and/or the first switching member 18 in the opposite order; hence setting the second switching member 22 into the open position as depicted and the first switching member 18 into the first position providing electrical connection between the first terminal 14A and the first electrode 14 of the battery cell 10, once the previously dangerous state of the battery cell 10 is no longer present.

A decision, whether the dangerous state of the battery cell 10 is still present may be detected, without any limitation using the sensor 28. As before, the communication between the control unit 20 and the outside of the battery cell 10, for example, the battery management system may be provided by a communication using for example a communication line 26 and/or the transmitting element 24 in combination with the communication line 26A (see FIG. 3).

In FIG. 5 there is depicted a plurality of battery cells 10A, 10B, . . . , 10J in combination with a load 100. Suppose the individual battery cells 10A, 10B, . . . , 10J are connected in series as depicted in FIG. 5. If now an individual one of the battery cells 10A, 10B, . . . , 10J, say battery cell 10B, reaches a critical state or for whatever other reason the first switching member 18 of the battery cell 10B is switched to the second position, i.e. the separating position, almost the whole voltage provided to the load 100 will be present between the first terminal 14B and the second electrode 16B of the battery cell 10B. More precisely the voltage will be (J−1) times the voltage provided per individual cell. If one considers a series of 20 cells connected in series, each of them providing a voltage U, then with only the battery cell 10B in a condition as shown in FIGS. 2 and 3, the voltage between the first terminal 14B and the second electrode 16B will be (J−1)*U, which may be a considerably high voltage. With the embodiment as shown in FIG. 4, wherein the second switching member 22 reaches the closed state, and, hence, provides the bypass, after the first switching member 18 is set to the second position, the high voltage between the first terminal 14B and the second electrode 16B of the individual cell 10B in the dangerous state, is no longer provided and an overall voltage of (J−1)*U is provided to the load 100 but no longer at the individual terminals 14B, 16B, once the bypass is established.

Figure 6:
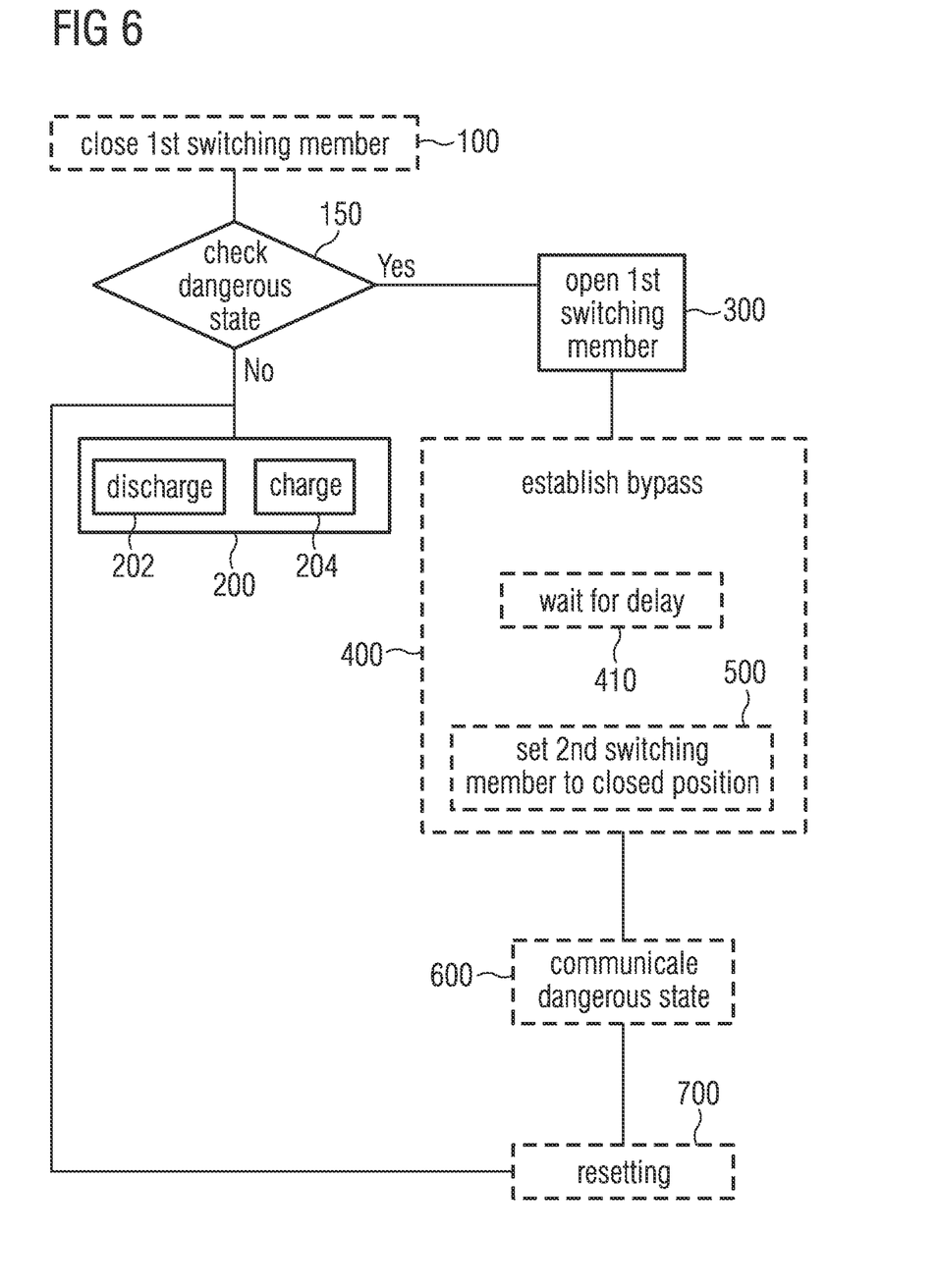
FIG. 6 is a diagram showing an illustrative example of a method according to the invention.

In FIG. 6 an exemplary embodiment of operating a battery cell 10 according to the invention is displayed.

The method may comprise an optional step 100 of closing the first switching member 18. This is to say that the step of closing 100 sets the first switching member 18 into the first position as described above. Hence a manufacturer may sell the battery cells 10 according to the invention in a state, wherein the first switching member 18 is in the open position or second position of the first switching member. Thereby the risk of a high voltage between the first terminal 14A and the second electrode 16 is reduced when the battery cell 10 is being shipped or stored. Likewise any danger stemming from the voltage is eliminated by setting the first switching member 18 in the open position, such as welding metal objects to the first electrode 14 and the second electrode 16, should both electrodes be touched simultaneously by a conductive object, such as a spanner but not limited thereto.

In a step 150 it is checked, whether the battery cell 10 is in a dangerous state, for whatever reason. A person of ordinary skill in the art will readily understand that this check may be performed by the control unit 20, perhaps in combination with the at least one sensor 28.

If it is detected that there is no dangerous state in step 150, than the method may precede to a step of operating 200 the battery cell 10. Without any limitation the operating step 200 may comprise a discharging 202 of the battery cell 10 and/or a charging 204 of the battery cell.

Should instead a dangerous state of the battery cell 10 be detected in step 150, the method may proceed to a step 300 of opening the first switching member 18, i.e. moving the first switching member to the second position. By doing so the first terminal 14A is isolated from the first electrode 14, as explained before.

The method may in case of a dangerous state comprise a step 400 establishing a bypass, the bypass being provided between the first terminal 14A and the second electrode 16. A person of ordinary skill in the art will appreciate that it may be of interest to perform the step 400 of establishing the bypass after the opening step 300. Therefore it may be of interest to provide a waiting step 410 of waiting a delay, preferably a selectable delay of time, before the step 500 of setting the second switching member 22 to the closed position is being performed.

Alternatively one may contemplate performing the step 500 of setting the second switch 22 before the step 300. In such a situation care is to be taken however for the switching 500 to the closed position and hence the establishing step 400 does not provide a short-cut between the first terminal 14A and the second terminal 16. Appropriate methods or types of switches in order not to shortcut the first electrode 14 and the second electrode 16 are known in the art and shall therefore not be explained any further in this invention disclosure.

The method may further comprise a step 600 of communicating a dangerous state of the battery cell 10. It is to be noted that the dangerous state may also be referred to as an exception. The exception may be without any limitation communicated to the control unit 20, an outside of the battery cell 10, for example via a communication line 28, and/or to a battery management system (not shown) outside the battery cell 10.

The method of operating the battery cell 10 may further comprise a step 700 of resetting the battery cell 10, for example a resetting of the battery cell 10 in case a dangerous state was reached before.

The step 700 of resetting shall be explained in more detail with reference to FIG. 7.

The step 700 of resetting may be initiated by a step 710 of receiving a command. The command may be without limitation received by the control unit 20 in order to initiate a resetting of the battery cell 10 after having reached the dangerous state. The command may be received via the communication line 26, optionally using the transmitting element 24, as explained above. It may be of interest for the battery management system to provide the command so that this command may be received in step 710.

In a step 720 of the resetting, it may be checked, whether there (still) is a dangerous state of the battery cell 10. Should there be a dangerous state detected, the resetting step 700 may be terminated as indicated by the EXIT step in FIG. 7.

The resetting may comprise a step 750 of switching the first switching member 18 to the first position, i.e. into the state connecting the first terminal 14A to the first electrode 14.

It may be of interest to perform a step 730 of opening the bypass prior to the step 750 of switching the first switching member 18. It may be convenient to additionally perform a waiting step 740 between the step 730 of opening the bypass and switching 750 the first switching member 18 to the first position.

Should one however wish to perform the step 750 of switching, i.e. closing the first switching member 18, as before one should take care for the established bypass not to shortcut the first electrode 14 and the second electrode 18, as was already explained before.

Figure 7:
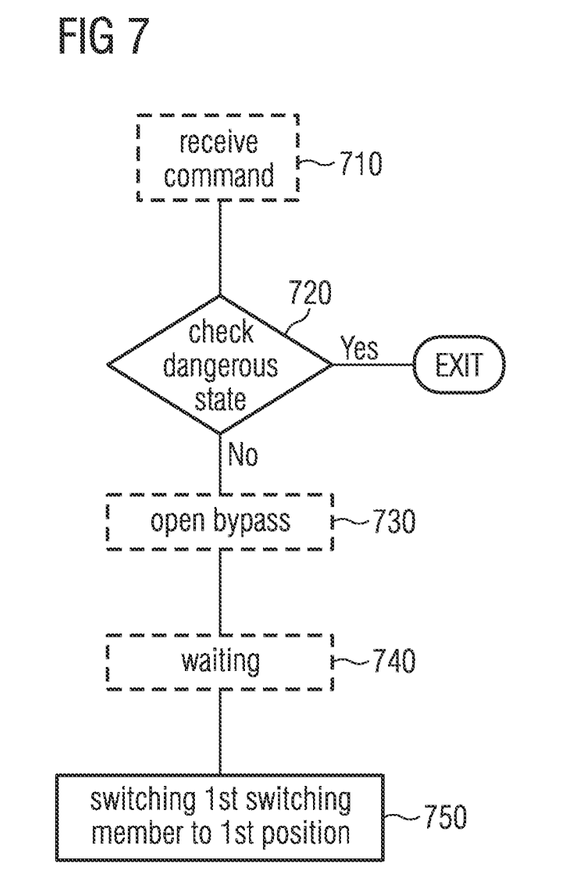
FIG. 7 is a diagram showing an illustrative example step of a resetting step for a battery cell that may form part of the method according to the invention.

A person of ordinary skill in the art will readily appreciate that although in FIG. 6 and 7 the exemplary methods were displayed for descriptive purposes, but the sequence of method steps displayed shall not be construed as implying a rigid sequence of method steps, but a mere possible example of method steps. In particular individual ones of the method steps may or may not be performed when practicing the operation of the battery cell 10 according to the present invention without departing from the spirit of the present invention.

It is to be understood that individual embodiments of the battery cell 10 as explained above may very well be combined, hence, for example the communication lines 24, 24A may be combined with those exemplary embodiments wherein the communication line is not shown and vice versa. Such modifications will be readily appreciated by a person of ordinary skill in the art and shall not be construed as departing from the scope of the present invention. All embodiments disclosed herein shall be by no means construed as limiting the invention but are given as no-limiting examples in order to allow for a person of ordinary skill in the art to work the invention.

REFERENCE NUMERALS

11 battery cell according to the state of the art
10 battery cell
12 battery cell stack
14 first electrode
16 second electrode
14A first terminal
16A second terminal
18 first switching member
20 control unit
22 second switching member
24 transmitting element
26, 26A communication line
100 load

The invention claimed is:

1. A method of operating a battery cell having a first switching member switchable between a first position and a second position, wherein when in the first position, the first switching member connects a first electrode of a battery stack to a first terminal of the battery cell, and wherein when in the second position, the first switching member separates the first electrode from the first terminal, the method comprising:
   checking if there is a dangerous state of the battery cell;
   operating the battery cell if there is no dangerous high voltage state; and
   opening the first switching member in case of the dangerous high voltage state, wherein the opening step comprises a reversible opening of the first switching member.

2. The method according to claim 1, wherein the first switching member is arranged inside the battery cell.

3. The method according to claim 1, wherein the battery stack comprises at least one of the first electrode, a second electrode, an active material, a separator, and/or a conducting material.

4. The method according to claim 1, further comprising:
   a second switching member switchable between a closed position and an open position;
   wherein when in the closed position, the second switching member connecting the first terminal to a second electrode of the battery cell; and
   when in the open position, the second switching member isolating the first terminal from the second electrode.

5. The method according to claim 4, further comprising a control unit adapted to switch the first switching member and/or the second switching member.

6. The method according to claim 4, wherein the second switching member is selected from a semiconductor switch, a relay, a transistor, a field effect transistor, a MOS-FET, a solid state switch, or a mechanical switch.

7. The method according to claim 5, wherein the control unit is adapted to switch the second switching member to the closed position after the first switching member reached the second position.

8. The method according to claim 5, wherein the control unit provides a delay, preferably a selectable delay, before switching the second switching member to the closed position after the first switching member reached the second position.

9. The method according to claim 5, wherein the control unit is powered from the battery cell and/or comprises an independent power source.

10. The method according to claim 5, wherein the battery cell further comprises at least one sensor coupled to the control unit, and wherein the switching of the first switching member and/or the second switching member is in response to a sensor signal sensed at the sensor.

11. The method according to claim 10, wherein the at least one sensor is selected from the group comprising a pressure sensor, a temperature sensor, a voltage sensor, a gas detector.

12. The method according to claim 5, further comprising a communication line connecting the control unit with an outside of the battery cell.

13. The method according to claim 5, further comprising a transmitting and/or receiving element.

14. The method according to claim 1, wherein the first switching member is selected from a semiconductor switch, a relay, a transistor, a field effect transistor, a MOS-FET, or a solid state switch.

15. The method according to claim 1, wherein the step of operating comprises:
charging of the battery cell, and/or
discharging of the battery cell.

16. The method according to claim 1, further comprising:
establishing a bypass between a second electrode and a first terminal of the battery cell.

17. The method according to claim 16, wherein the establishing comprises:
setting a second switching element to a closed position, in order to establish the bypass,
wherein the second switching element is a reversible switching element.

18. The method according to claim 16, wherein the establishing comprises:
waiting for a selectable delay before the second switching element is set to the closed position.

19. The method according to claim 1, further comprising:
setting the first switching member to the first position before the checking and/or the operating, respectively.

20. A method of operating a battery cell having a first switching member switchable between a first position and a second position, wherein when in the first position, the first switching member connects a first electrode of a battery stack to a first terminal of the battery cell, and wherein when in the second position, the first switching member separates the first electrode from the first terminal, the method comprising
checking if there is a dangerous high voltage state of the battery cell;
operating the battery cell if there is no dangerous high voltage state;
opening the first switching member in case of the dangerous high voltage state; and
resetting of the battery cell, the resetting comprising:
setting the first switching member to the first position, if there is no dangerous high voltage state of the battery cell; and
setting the first switching member to the first position in response to receiving a command from a battery management system.

21. The method according to claim 20, wherein the resetting comprises:
terminating the resetting, if there is a dangerous high voltage state of the battery cell.

22. The method according to claim 20, the resetting further comprising:
opening a bypass of the battery cell.

23. The method according to claim 22, further comprising waiting a selectable period of time before the opening.

24. A method of operating a battery cell having a first switching member switchable between a first position and a second position, wherein when in the first position, the first switching member connects a first electrode of a battery stack to a first terminal of the battery cell, and wherein when in the second position, the first switching member separates the first electrode from the first terminal, the method comprising:
checking if there is a dangerous high voltage state of the battery cell;
operating the battery cell if there is no dangerous high voltage state;
opening the first switching member in case of the dangerous high voltage state; and
communicating the dangerous high voltage state within the battery cell to a battery management system.

* * * * *